US006862572B1

(12) United States Patent
de Sylva (10) Patent No.: US 6,862,572 B1
(45) Date of Patent: Mar. 1, 2005

(54) SYSTEM AND METHOD FOR FACILITATING INTERACTION BETWEEN BUSINESSES, DELIVERY AGENTS, AND CUSTOMERS

(76) Inventor: Robert F. de Sylva, 161 Ocean Park Blvd. #D., Santa Monica, CA (US) 90405

( * ) Notice: Subject to any disclaimer, the term of this patent is extended or adjusted under 35 U.S.C. 154(b) by 0 days.

(21) Appl. No.: 09/556,158

(22) Filed: Apr. 21, 2000

(51) Int. Cl.[7] .................................. G06F 17/60
(52) U.S. Cl. .................................................. 705/7
(58) Field of Search ....................... 709/7; 705/7, 8, 705/9, 26

(56) References Cited

U.S. PATENT DOCUMENTS

| | | | | |
|---|---|---|---|---|
| 5,043,908 A | * | 8/1991 | Manduley et al. | 198/349.6 |
| 5,809,479 A | * | 9/1998 | Martin et al. | 235/376 |
| 5,930,763 A | * | 7/1999 | Kaneko et al. | 705/7 |
| 6,047,271 A | * | 4/2000 | Danford-Klein et al. | 705/400 |
| 6,085,170 A | * | 7/2000 | Tsukuda | 345/961 |
| 6,167,378 A | * | 12/2000 | Webber, Jr. | 705/7 |
| 6,219,653 B1 | * | 4/2001 | O'Neill et al. | 705/26 |
| 6,370,523 B1 | * | 4/2002 | Anderson | 379/127.01 |
| 6,463,420 B1 | * | 10/2002 | Guidice et al. | 705/28 |
| 2001/0047284 A1 | * | 11/2001 | Blalock et al. | 705/8 |
| 2002/0019699 A1 | * | 2/2002 | McCarty et al. | 701/211 |

FOREIGN PATENT DOCUMENTS

| | | | | |
|---|---|---|---|---|
| JP | 09016736 A | * | 1/1997 | G06K/19/07 |
| JP | 09331571 A | * | 12/1997 | H04Q/7/34 |

OTHER PUBLICATIONS

Bedi, Bishen, Going Places in the Courier Business, Dec. 16, 1999, Malaysian Business. Kuala Lumpur, p. 27. [ProQuest].*

* cited by examiner

*Primary Examiner*—Tariq R Hapiz
*Assistant Examiner*—Andre Boyce (57) ABSTRACT

A system for facilitating interaction between businesses, independent delivery agents, and customers. The system includes a customer product order interface that receives customer product orders as input and provides a first signal in response thereto. The customer product orders are associated with a predetermined business. A look-up system for selects an independent delivery agent to deliver a product to the customer in response to the first signal and with reference to a distance between said delivery agent, the customer, and the business, and provides a second signal in response thereto. A delivery agent order delivery system for provides the selected delivery agent with a delivery order based on the customer product order in response to the second signal.

10 Claims, 5 Drawing Sheets

SYSTEM AND METHOD FOR FACILITATING INTERACTION BETWEEN BUSINESSES, DELIVERY AGENTS, AND CUSTOMERS

BACKGROUND OF THE INVENTION

Field of Invention

This invention relates to network applications and methods for selectively transferring information between users of the network. Specifically, the present invention relates to systems for facilitating delivery of products and services between businesses, delivery agents, and customers via the Internet or other network.

Description of the Related Art

Internet sales are limited by shipping delays and shipping fees, which contribute to consumer aversion to online purchasing. Consumers demand expedient, cost-effective delivery of merchandise and fast access to services ordered via online businesses.

Conventional systems and methods for facilitating immediate merchandise delivery require expensive order fulfillment centers. Consequently, system coverage area is greatly limited by fulfillment center locations. Furthermore, customer product selection is severely limited by fulfillment center inventory. Inventory and geographic expansion are limited by fulfillment center development costs and advertising costs. Furthermore; such systems and methods often do not accommodate distribution or dispatch of services, such as doctors, taxis, gardeners, mechanics, and so on.

Various companies, such as Shipper.com, Webvan, NetGrocer, and Kozmo attempted to provide expedient merchandise delivery. Unfortunately, many of these companies employed conventional delivery paradigms that relied on building or acquiring expensive infrastructure. Consequently, their coverage areas were often limited by warehouse locations. Offered inventory was limited by fulfillment center size.

Many businesses employing conventional delivery paradigms must use advertising funds to offset expensive shipping fees. Unfortunately, these businesses may fold if advertising funds are depleted before achieving consumer acceptance of their services. Such inefficient delivery paradigms may retard delivery business growth and thereby inhibit Internet commerce expansion.

Hence, a need exists in the art for a system and method that facilitates expedient and cost-effective delivery of products and services between businesses and customers that does not require delivery infrastructure construction nor purchase nor is limited by inventory thereof.

SUMMARY OF THE INVENTION

The need in the art is addressed by the system for facilitating transactions between customers and businesses of the present invention. In the illustrative embodiment, the inventive system is adapted for use with the Internet and includes a first mechanism for initiating a transaction between a customer and a business entity. The business transaction is associated with a product or service. A second mechanism automatically selects a mechanism for delivering the product or service to the customer based on predetermined selection criteria and provides a signal in response thereto. A third mechanism automatically provides the product or service to the customer via the selected mechanism for delivering in response to the signal.

In a specific embodiment, the predetermined selection criteria are based on the product or service, the customer, and/or the business entity. The predetermined selection criteria include status information indicative of whether the business transaction is associated with a product or a service or both. The predetermined selection criteria also include a maximum value of $W_c$, which is defined in accordance with the following equation:

$$W_c = aW_P + bW_R + cW_D,$$

where $W_P$ is a function of delivery prices associated with the mechanism for delivering; $W_R$ is a function of delivery reliability of the mechanism for delivering; WD is a function of the distance between the mechanism for delivering, the customer, and a business outlet associated with the business entity; and a, b, and c, are customer-adjustable coefficients.

The second mechanism includes a mechanism for automatically selecting a best mechanism for delivering from a plurality of mechanisms for delivering based on a distance between the best mechanism for delivering, the business entity, and the customer. The plurality of mechanisms for delivering include independent delivery agents and/or businesses. In the illustrative embodiment, the best mechanism for delivering is the best messenger service selected from a plurality of messenger services. The distance between the best messenger service, the business entity, and the customer is minimized.

The novel design of the present invention is facilitated by the second mechanism, which may select an independent messenger or other delivery agent to deliver a product or provide a service to the customer based on the distance between the delivery agent or dispatch location thereof, the nearest store that has the product in stock, and the customer. Hence, embodiments of the present invention may employ geographically dispersed independent delivery agents to expediently deliver merchandise and/or services from participating business outlets to consumers that order the merchandise and/or service(s). Embodiments of the present invention may reduce or eliminate the need to build or purchase expensive delivery infrastructure by employing pre-existing delivery agent infrastructure. Furthermore, embodiments of the present invention may provide a competitive environment wherein delivery agents may compete for delivery business, which drives down shipping fees.

Hence, the present invention facilitates expedient and cost effective-delivery of products between businesses and customers and does not require the purchase of expensive delivery infrastructure nor is limited by inventory thereof

BRIEF DESCRIPTION OF THE DRAWINGS

FIG. 2 is a more detailed block diagram illustrating various functional components of the messenger dispatch system of FIG. 1.

FIG. 3 is a flow diagram of a unique messenger selection method employed by the messenger dispatch system of FIG. 2.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
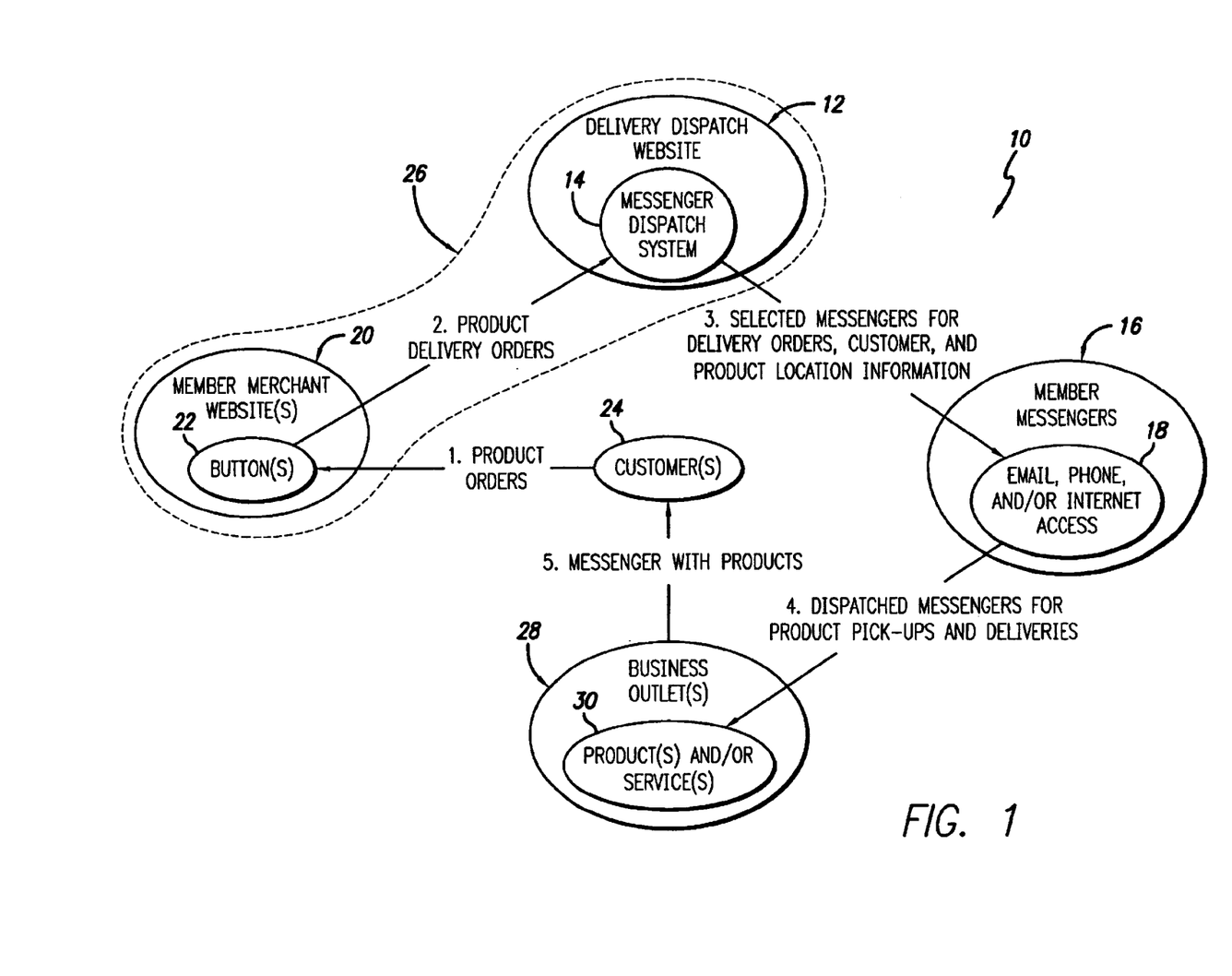
FIG. 1 is a diagram illustrating an exemplary operative scenario of an embodiment of the messenger dispatch system of the present invention.

FIG. 1 is a diagram illustrating an exemplary operative scenario 10 implemented via a messenger dispatch system 14 of the present invention. For clarity, various aspects of the operative scenario 10, such as databases and phone systems are omitted. However, those skilled in the art with access to the present teachings will know where and how to implement the additional components required to meet the needs of a given application. For the purposes of the present discussion, the term messenger refers to any independent messenger service, delivery agent, dispatching personnel, or business thereof. Furthermore, independent delivery agents or messengers are business entities whose operations and ownership are sufficiently separate from other entities of the operative scenario 10 to enable competitive forces between the delivery agents to drive down shipping fees and result in other related benefits afforded by the present invention, as discussed more fully below.

The operative scenario 10 includes a delivery dispatch website 12 having a messenger dispatch system 14. The delivery dispatch website 12 communicates electronically with a pool of messengers 16 via email, phone, the Internet 26 or other communications mechanisms (not shown). The delivery dispatch website 12 communicates with merchant websites 20 that have a delivery dispatch button 22. Customers 24 communicate with the member merchant websites 20.

In the present specific embodiment, the Internet 26 facilitates communications between the customers 24, merchant websites 20, the delivery dispatch website 12, and messengers 16. Those skilled in the art will appreciate that other communications mechanisms instead of or in addition to the Internet 26 may be employed to facilitate communications between the merchant websites 20, the delivery dispatch website 12, and messengers 16, without departing from the scope of the present invention.

The messengers 16 communicate with physical business outlets 28, such as via email, phone, or Internet mechanisms 18, and may send personnel to physically travel to stores, warehouses, restaurants, and other service outlets to obtain products and services 30 associated with the physical business outlets 28. The business outlets 28 may communicate with the customers 24 via telephone and via messengers traveling from the business outlets 28 to the customers 24.

In operation, customers 24 browse the merchant websites 20 for products or services. When a customer 24 decides to purchase a product or service and have the product delivered or the service dispatched, the customer 24 clicks on the delivery dispatch button 22. The delivery dispatch button 22 then activates a form (not shown) wherein the customer enters information pertaining to the desired product(s) or service(s), address or other location information pertaining to the customer 24, and payment information.

Alternatively, the delivery dispatch button 22 may retrieve pre-existing product or service information, address, and payment information from a shopping cart or other e-commerce functionality built into the merchant websites 20. The order information is then transferred to the messenger dispatch system 14 running on the delivery dispatch website 12. The transfer may be implemented via the Internet 26 by employing conventional technologies, such as Common Gateway Interface (CGI). The messenger dispatch system 14 receives the order information and selects a messenger 16 from the member messengers 16 to provide the ordered product(s) and/or service(s) to the customer 24.

The messenger dispatch system 14 employs a unique selection process. In the present specific embodiment, the selection process is based on the distance between messengers 16 and the physical outlets 28 that have the desired product(s) in stock or service(s) available and the distance between said physical outlets 28 and the customer 24.

Initially, the messenger dispatch system 14 determines a set of candidate outlets associated with the merchant website 20 at which the customer 24 placed the order. The candidate outlets are physical outlets, which are a subset of the outlets 28. The candidate outlets may include stores or warehouses that have the ordered product(s) and/or service(s) available. The messenger dispatch system 14, as discussed more fully below, accesses product inventory tracking systems associated with the physical business outlets 28 and the corresponding merchant websites 20 to select the candidate outlets.

The messenger dispatch system 14 also includes software and systems, as discussed more fully below, for selecting a subset of candidate messengers from the member messengers 16. The candidate messengers are available messengers that have predetermined coverage areas that overlap the location of the customer 24 and the location of one or more candidate outlets. The customer location is specified in the address or other location information provided to the messenger dispatch system 14 via the delivery dispatch button 22. The messenger dispatch system 14 then picks the messenger from the candidate messengers so that the distance between the selected messenger, a candidate outlet within the coverage area of the messenger, and the customer is a minimum.

In an illustrative embodiment, as discussed more fully below, the messenger dispatch system 14 computes distances between candidate messengers and associated candidate outlets and customers 24. Each candidate messenger is assigned a distance weight ($W_D$) based on the minimum distance between the candidate messenger, an associated candidate business outlet, and the customer. Smaller distances are associated with larger distance weights. In addition, each candidate messenger is assigned a price weight ($W_P$) in accordance with delivery rates of the associated messenger. Messengers with higher rates are assigned lower deliver weights. Furthermore, each messenger is assigned a reliability weight ($W_R$) in accordance with the reliability track record of the messenger. Less reliable messengers are assigned lower reliability weights.

The messenger dispatch system 14 then combines the weights in accordance with a predetermined equation to yield a combined weight $W_c$. The available messenger associated with the maximum combined weight (max($W_c$)) is then selected as the messenger to deliver the product to the customer 24. In the present specific embodiment, the following equation is employed to determine the combined weight $W_c$:

$$W_c = aW_R + bW_R + cW_D, \qquad [1]$$

where a, b, and c are adjustable coefficients that are set in accordance with the demands of a given application. For example, a form (not shown) associated with the delivery dispatch button 22 may contain a button list or other selection method for allowing the customer 24 to select priorities for deliver time, reliability, and price, which are used to establish the coefficients c, b, and a, respectively.

Use of the above weight-combining method to select messengers for product delivery enhances competition between messengers, since the most reliable, least expensive messengers are most likely to be selected for additional delivery business via the messenger dispatch system 14. Hence, the messenger dispatch system 14 may promote reduced shipping prices and improved delivery reliability by facilitating messenger competition. The tendency of the present invention to promote reduced shipping fees and expedient delivery represent unobvious and unexpected results, which yield significant advantages. Furthermore, the combination of the present invention and the medium for which the present invention is adapted, including the Internet, provides efficient mechanisms by which independent businesses associated with the merchant websites 20 may drive down delivery prices. For example, the merchant websites 20 may pay the proprietor of the dispatch system 14 to reduce or eliminate shipping fees for customers accessing the merchant websites 20 and employing the dispatch system 14.

Those skilled in the art will appreciate that the messengers 16 may be other types of independent delivery agents, such as Automobile Association of America (AAA) service dispatch personnel, taxi services, and so on, without departing from the scope of the present invention. In addition, equation (1) may be replaced with another formula involving one or more of the variables $W_D$, $W_P$, $W_R$, or additional variables (one or more of the coefficients a, b, and c, may be set to zero), without departing from the scope of the present invention.

FIG. 2 is a more detailed block diagram illustrating various functional components of the messenger dispatch system 14 of FIG. 1. For clarity, various components and interconnections between modules are omitted from FIG. 2, however one skilled in the art will know how to implement the additional components required to meet the needs of a given application.

The merchant websites 20 receive orders for products or services from the customers 24. The ordered products or services are delivered from the business outlets 28 corresponding to the merchant websites 20 via messengers selected from the messengers 16. The messengers are selected via the messenger dispatch system 14. For the purposes of the present discussion, customer order information includes product identification information (such as the name of the product or a corresponding order number), customer location information (such as address), and the name or identification number of the business organization associated with the product (such as Wal-Mart).

The messenger dispatch system 14 includes an optional messenger bidding system 40, which receives an auction-enable signal as input from the merchant web sites 20. The messenger bidding system 40 provides a winning messenger as output to a messenger selection system 42.

The messenger selection system 42 receives order information from the merchant websites 20 in addition to the winning messenger information from the messenger bidding system 40. The messenger selection system 42 provides information pertaining to a selected messenger to a map generator 44. The map generator 44 generates a map based on the addresses of the selected messenger, the selected business outlet, and the customer associated with the order.

The messenger selection system 42 communicates with a messenger database 46 and provides order information identifying the requested product(s) or service(s) to the messenger database 46. The messenger selection system 42 also retrieves selected messenger address information and related data, which is selectively provided to the map generator 44. The messenger selection system 42 also receives input from a distance determination system 48. In the present specific embodiment, the input specifies the fastest, most cost-effective, and reliable available messenger that is closest to an associated business outlet and the customer. The distance determination system 48 provides the address of the associated business outlet and the address of the messenger selected by the distance determination system 48 to the messenger selection system 42. Order information is also provided by the messenger selection system 42 to a product availability database 50.

The product availability database 50 communicates with the distance determination system 48, a merchant location database 52, and a merchant inventory tracking system 54 and obtains business outlet locations and product availability information therefrom. The merchant database 52 receives merchant location and product information input from a merchant interface 56.

The distance determination system 48 receives input from the messenger database 46 detailing tentatively available messengers and coverage areas associated with the tentatively available messengers that overlap the delivery address, i.e., location, associated with the customer 24. The distance determination system 48 outputs, to the messenger availability verification system 58, closest messenger identification information (such as location and name and phone number), customer order information, and identification information pertaining to the business outlet near the closest messenger. The messenger availability verification system 58 outputs messenger availability status information to the distance determination system 48.

A messenger bidding system 40 and an automatic messenger email sender and checker 64 receive input from the messenger availability verification system 58. The input includes messenger availability queries, customer order information, nearby business outlets that can immediately provide the ordered product(s) and/or service(s), and nearby tentatively available messengers whose coverage areas overlap both one or more of the nearby business outlets and the location of the customer 24. For the purposes of the present discussion, the location of the customer 24 is equivalent to the delivery destination or shipping address associated with the customer 24.

The messenger bidding system 40 provides output to the messenger selection system 42 specifying the winning messenger selected in accordance with a bidding process as discussed more fully below. The messenger bidding system 40 is selectively enabled via an auction enable signal received from the merchant website 20 associated with the current order.

The automatic messenger email sender and checker 64 communicates with the messengers 16 and exchanges availability queries and responses. The automatic email sender and checker 64 also communicates with an automatic messenger phone calling system 60 that communicates with the messengers 16 via telephone. The automatic messenger email sender and checker 64 provides query results and/or phone call results as input to the messenger availability verification system 58. The messenger availability verification system 58 provides messenger availability results as input to the distance determination system 48.

In operation, customers 24 browse the merchant websites 20 via the Internet. When a customer 24 locates product(s) and/or service(s) that the customer 24 wishes to purchase and have immediately delivered, the customer 24 clicks on the delivery dispatch button 22 (see FIG. 1) or activates another similar or related mechanism.

Often customers 24 employ electronic shopping carts provided via the merchant websites 20. Upon checkout, customers 24 are often given the option to select a delivery method. If the customer 24 elects to employ the delivery dispatch website 12 (see FIG. 1) and associated dispatch system 14, then the customer 24 is provided with a form wherein the customer 24 may choose various sub-options. For example, the customer 24 may choose to run a bid among nearby available messengers who will compete to deliver the product(s) and/or service(s) by marking an appropriate check box and clicking a submit button. Clicking the submit button then activates the enable signal to the messenger bidding system 40 and may optionally disable the automatic messenger email sender and checker 64.

Furthermore, the form may include fields wherein the customer 24 may specify the coefficients a, b, and c for equation (1). If the customer 24 elects to run a bid, the auction enable signal is forwarded from the merchant web site 20 to the messenger bidding system 40.

The enable signal enables the messenger bidding system 40 to run an auction wherein the customer's order is auctioned to the messenger offering the highest combined weight $W_c$. In the present embodiment, the price weight $W_p$ is adjustable by bidding messengers, whereas remaining weights $W_R$ and WD are predetermined by the messenger dispatch system 14. Alternatively, a new delivery time weight WT may be added to equation (1) along with a new scaling coefficient d yielding the following equation:

$$W_c = aW_P + bW_R + cW_D + dW_T. \quad [2]$$

The bidding messengers may then control the time weight $W_T$ and the price weight $W_P$ attempting to provide the highest $W_c$. The time weight $W_T$ incorporates an estimated delivery time. If a messenger continually under estimates the delivery time $W_T$ to obtain orders, their reliability weight $W_R$ will drop. This inhibits messenger cheating, reducing incentives to falsify $W_T$. This is an unobvious benefit achieved via embodiments of the present invention. In particular, incorporation of the weight $W_R$ improves the fairness of the messenger selection bidding process while also promoting messenger competition, which may improve delivery reliability. Conventional delivery systems and methods often lack mechanisms by which competitive forces are employed to reduce shipping fees and increase fairness and reliability of delivery services and associated selection systems. This novel use of competitive forces is facilitated by the fact that the messengers 16 include independent delivery agents that may compete among themselves to obtain business via the dispatch system 14.

The messenger dispatch system 14 selects messengers from the messengers 16 to participate in the bidding process implemented by the messenger bidding system 40. When the delivery dispatch button 22 is pressed, and the corresponding form, including order information and an auction enable or disable indication, is submitted to the messenger dispatch system 14, the order information is transferred to the messenger selection system 42. The auction enable or disable indication is sent to the messenger bidding system 40.

The messenger selection system 42 provides customer address information to the messenger database 46 and order information to the product availability database 50. The messenger database 46 accesses messenger prices, hours of operation, current messenger availability status, delivery times per distance, and coverage areas via a messenger interface 62. The messenger interface 62 may be implemented via a special section on the delivery dispatch website 12 (see FIG. 1), where messengers 16 may provide the delivery dispatch website 12 with current information about their businesses, which is input to the messenger database 46. The messenger database 46 then employs the customer address provided by the messenger selection system 42 to select a set of tentatively available messengers (candidate messengers). The tentatively available messengers are messengers that are currently open for business and are tentatively indicated as being available and messengers with coverage areas that overlap the location of the customer 24 as indicated by the customer address information provided by the messenger selection system 42. The set of tentatively available messengers (and associated information) is then forwarded to the distance determination system 48.

The product availability database 50 employs the customer order information received from the messenger selection system 42 to determine a set of nearby business outlets associated with the business entity (which may be the owner of the merchant website 20) with which the initial order was placed. The order information includes requested product(s) and/or service(s), the address/location of the customer 24, and an identification number (or name) of the business entity associated with the merchant website 20 at which the customer placed the initial order.

The product availability database 50 checks the merchant product-tracking system 54 to determine the N business outlet locations closest to the location of the customer 24 that have the ordered product(s) in stock and/or the ordered service(s) available. N is a predetermined integer. N may vary in accordance with a predetermined geographic region about the customer address. For example, the product availability database 50 may extract all business outlets within a ten-mile radius of the customer. Alternatively, an upper limit of N may be set. For example, if N is set to ten, then the product availability database 50 extracts the ten closest business outlets to the customer 24. If only one business outlet has the product in stock, then only one business outlet is extracted by the product availability database 50 from the merchant product-tracking system 54. Many merchants already have inventory tracking systems, such as the systems 54 with which the product availability database 50 may interface.

For smaller stores lacking inventory-tracking systems that easily interface with the product availability database 50, the merchant database 52 and merchant interface 56 may be employed. The product availability database 50 may be continually updated via the merchant database 52, which is updated via the merchant interface 56. The merchant interface 56 allows merchants to enter new product information, hours, and business, outlet locations. Those skilled in the art will appreciate that the messenger interface 62 and the merchant interface 56 may be implemented via software running on messenger and merchant computer systems, respectively, rather than software running on the dispatch system 14 and associated website 12 (see FIG. 1).

The product availability database 50 then provides locations and phone numbers of the N selected business outlets along with customer order information to the distance determination system 48. The distance determination system 48 then uses the locations of the tentatively available messengers provided via the messenger database 46 and the locations of the N nearby business outlets having the product(s) in stock and/or the service(s) available (provided via the product availability database 50) to rank combinations of the N business outlets and tentatively available messengers in accordance with combined weights $W_c$ as defined in equation (1). Alternatively, the messengers are ranked solely in accordance with the distance weight $W_D$.

In some situations, locations of some of the N selected business outlets may fall outside the coverage areas of some of the tentatively available messengers. Combinations of messengers and business outlets wherein the business outlets do not lie within the coverage areas of the messengers are discarded from the ranking list.

Messenger and business outlet locations pertaining to the top M ranking combinations of messengers and merchants are provided to the messenger availability verification system 58. The messenger availability verification system 58 sends availability queries to the automatic messenger email sender and checker 64 and the messenger bidding system 40 along with the M top ranking combinations of messengers and merchants, or a predetermined subset thereof. If the messenger bidding system 40 is enabled via an enable signal from the merchant website 20, then the M selected top ranking messengers (associated with the M top ranking combinations) are contacted via email, chat, or other network functionality (not shown) and asked to enter price and delivery time estimates for the customer order that is up for bid. The messenger bidding system 40 affords messengers 16 the option to improve their original estimates based on competitive estimates from other messengers before the winning messenger is selected. The winning messenger is the messenger with the largest combined weight defined in accordance with equation (2). Location information and messenger identification information associated with the winning messenger is provided to the messenger selection system 42.

If the customer 24 sets the constants b, c, and d of equation (2) to zero, then the bidding process is based on delivery prices ($W_P$) alone, assuming the constant a is not also zero. Similarly, if the customer 24 sets the constants b and c to zero, then the bidding process is based on a combination of the estimated delivery times and prices, with relative priority of prices verses delivery times determined via the constants a and d. This system provides an efficient conduit through which market forces may positively affect delivery times, prices, and reliability in accordance with what the customers 24 value most (low prices, reliability, and/or fast delivery time).

If the messenger bidding system 40 is not enabled, then the automatic messenger email sender and checker 64 sends email, chat, or other types of network queries to the messengers 16 to determine the immediate availability status of the M top-ranking messengers 16. The queries are first sent to the highest ranking of the M messengers. If no immediate response is received, then queries are sent to the next highest-ranking messenger of the M messengers. The process repeats until an available messenger is found or none of the M highest ranking messengers immediately respond to the queries, whichever occurs sooner. Alternatively, a set of immediately available messengers may be determined from the M messengers. Location, contact, and identification information pertaining to the messengers of the set may then be provided back to the messenger availability verification system 58 or to the messenger bidding system 40, which runs a bid among the set of messengers when enabled.

Messengers that do not immediately respond to availability queries sent by the automatic messenger email sender and checker 64 are considered temporarily unavailable. If none of the M top-ranking messengers immediately respond to the network queries, then phone calls are placed to the M top-ranking messengers via the automatic messenger phone calling system 60 starting from the highest ranking messenger. The highest ranked messenger of the M highest ranking messengers that immediately responds to the network queries or the phone calls placed via the automatic messenger phone calling system 60 becomes the selected messenger.

If the messenger bidding system 40 is enabled, the automatic messenger email sender and checker 64 may be disabled. Alternatively, the messenger bidding system 40 may employ the automatic messenger email sender and checker 64 to select messengers based on their current availability status to participate in the bidding process.

If the messenger bidding system 40 is disabled, the selected messenger(s) is provided to the distance determination system 48. The distance determination system 48 forwards information pertaining to the highest ranking selected messenger and the corresponding business outlet to the messenger selection system 42.

If the messenger bidding system 40 is enabled, then the messenger selection system 42 forwards messenger location, associated business outlet location, messenger contact, and messenger identification information corresponding to the winning messenger from the auction to the map generator 44. The map generator 44 then constructs a map depicting the location of the customer and associated business outlet relative to the selected messenger and then forwards the map to the selected messenger 16. The messenger 16 then employs the map to facilitate delivery of the ordered product (s) and/or service(s). Those skilled in the art will appreciate that the map generator 44 may be omitted without departing from the scope of the present invention.

Hence, information corresponding to selected messengers is provided by the distance determination system 48 to the messenger availability verification system 58 in descending order in accordance with their combined weights $W_c$. If the messenger with the highest combined weight $W_c$ is not immediately available to deliver the product or dispatch the appropriate service, then the available messenger with the next highest combined weight is checked. The process repeats until an immediately available messenger willing to handle the product delivery or service dispatch is found.

If the messenger bidding system 40 is disabled, then information pertaining to the selected messenger and business outlet provided by the distance determination system 48 and/or the messenger availability verification system 58, along with order information, is forwarded to the map generator 44. The map generator 44 then generates an appropriate map and forwards the map to the selected messenger 16 to facilitate delivery.

In an alternative embodiment, the distance determination 48 initially selects a tentatively available messenger 16 that is closest to a business outlet that is closest to the customer 24. If the selected messenger is not immediately available as determined via the messenger availability verification system 58, then the next closest messenger is chosen as the selected messenger, and then the current availability status of that next messenger is checked. The process repeats until an immediately available messenger willing to handle the delivery is found. Tentatively available messengers are messengers whose business hours suggest that they are currently open for business.

In a specific scenario wherein N=1, the closest business outlet to the customer 24 that has the product in stock and is associated with the business entity through which the customer placed the initial delivery order is output from the product availability database 50. Candidate messengers are further narrowed by the distance determination system 48 based on whether the coverage areas of the messengers overlap both the locations of the customer and the selected store. Functionality of the messenger dispatch system 14 may be adjusted to allow a customer to select a particular messenger and a particular business outlet for delivery of product(s) or service(s) without departing from the scope of the present invention.

In general, nearby business outlets having the ordered product(s) in stock or service(s) available that are within a predetermined radius about the customer are provided by the product availability database 50 to the distance determination system 48. Tentatively available messengers whose coverage areas overlap one or more of the nearby business outlets and the customer 24 are also provided to the distance determination system 48. The distance determination system 48 then runs a search, which analyzes customer, business outlet, and messenger information and sorts the messengers and corresponding business outlets in order of the total combined weight $W_c$ as determined via equation (1), equation (2), or another equation (not shown). Combinations of a messenger and a business outlet wherein locations of the business outlets are outside the coverage areas of given messengers are eliminated from the selection process. The distance determination system 48 searches all the combinations of tentatively available messengers and stores and the single customer location to find the optimal combination of messenger (delivery agent) and store (business outlet). The combinations are listed in order of preference in accordance with their combined weights $W_c$. The messenger availability verification system 58 starts at the top of the list and moves down until an immediately available messenger is found.

When a messenger 16 is selected for delivery by the messenger dispatch system 14, the phone number and name of the selected messenger 16 are provided to the customer 24 via a response web page. The response web page is sent to the customer 24 from the messenger selection system 42 of the messenger dispatch system 14 in response to the submitting of the dispatch delivery order form (not shown) associated with a merchant website 20. The dispatch delivery order form is provided in response to the pressing of the delivery dispatch button 22 on the merchant website 20 (see FIG. 1).

If the selected messenger does not timely deliver the requested product(s) or service(s), the customer 24 may enter the phone number of the messenger and the amount of time by which the messenger was late into the messenger database 46 via a user interface (not shown) to the messenger dispatch system 14. The messenger database 46 may then adjust the reliability weight $W_R$ assigned to the messenger 16 accordingly.

Addresses employed by the messenger dispatch system 14 may be replaced by other position information, such as Global Positioning System (GPS) coordinates, without departing from the scope of the present invention.

If the messenger dispatch system 14 does not find an available messenger and a business outlet that can provide the product(s) and/or service(s) to the customer, then the customer 24 is informed that the delivery order cannot be handled by the messenger dispatch system 14 at this time. Alternatively, the order may be transferred to a special operations delivery section (not shown) of the messenger is dispatch system 14. The special operations section makes special arrangements to provide the product(s) and/or service(s) via special delivery dispatch systems and methods, delivery personnel and/or delivery dispatch partners.

FIG. 3 is a flow diagram of a unique messenger selection method 70 employed by the messenger dispatch system 14 of FIG. 2. With reference to FIGS. 2 and 3, in an initial ordering step 72, the messenger dispatch system 14 obtains order information from the merchant websites 20 for each customer 24. The order information identifies the ordered product(s) and/or service(s), the shipping address or GPS coordinates (shipping destination) of the customer 24, the time of the order, the priority of the order, and the business entity with which the order was placed (such as Wal-Mart). Subsequently, control is passed to an outlet step 74.

In the outlet step 74, the product availability database 50 accesses the merchant product tracking system 54 and/or the merchant database 52 and provides a set of business outlets that have the ordered product(s) in stock or service(s) available. The business outlets are associated with the business entity with which the customer 24 placed the original order. The set of business outlets includes outlets that are located within a predetermined radius about the shipping destination. The predetermined region is application-specific and may be variable. Alternatively, the set of outlets may include only a single outlet that is closest to the shipping destination. Control is subsequently passed to an agent step 76.

In the agent step 76, the messenger database 46 selects a set of tentatively available delivery agents (messengers) that are currently open for business. The distance determination system 48 selects a subset of (or all of) the tentatively available messengers output from the messenger database 46. The subset contains delivery agents whose coverage areas include one or more business outlets of the set of business outlets output from the product availability database 50. Subsequently, control is passed to a weight-determination step 78.

In the weight-determination step 78, the distance determination system 48 searches the set of business outlets and the subset of delivery agents and ranks each combination of business outlet and delivery agent. The rankings are based on weights in accordance with equation (1). The distance determination system 48 may include factors such as estimated time required for delivery and/or distances between each delivery agent, the associated business outlet, and the shipping destination. Those skilled in the art will appreciate that additional weighting factors, different weighting factors, or a subset of the weighting factors in equation (1) may be employed without departing from the scope of the present invention. For example, the distance determination system 48 could rank each combination of business outlet and delivery agent in accordance with the size or experience of the delivery agent. Control is subsequently passed to a selection step 80.

In the selection step 80, combinations of the business outlets and delivery agents as provided via the weight-determination step 78 are tested for immediate availability. The combinations are tested in the order of their rankings, starting the most desirable combinations, until an immediately available delivery agent is found or until the set of combinations is exhausted.

If no immediately available delivery agent is found as determined in an agent-checking step 80, then control is passed to a display step 90. In the display step 90, a page is displayed in the browser employed by the customer 24 via the merchant website 20 indicating that delivery service is temporarily not available for the specified shipping destination and the method 70 ends. Alternatively, the order is handled via a special operations (not shown) section of the delivery dispatch website 12 of FIG. 1.

If an immediately available delivery agent is located, control is passed to a providing step 84. In the providing step 84, the messenger selection system 42 provides the customer with contact information pertaining to the found delivery agent, estimated delivery agent fees, and the estimated time of delivery. The customer 24 is given the option to accept the agent, fees, and delivery time in the acceptance-checking step 86. If in the acceptance-checking step 86 the customer declines service, the method 70 ends. Otherwise, control is passed to a sending step 88.

In the sending step 88, order information is provided to the selected delivery agent 16. The order information includes the shipping address/location of the selected business outlet, the address/location of the customer, and the order number associated with the ordered product(s) and/or service(s) (so that the delivery agent can pick up the product (s) or obtain or dispatch the service(s) to the customer). The delivery agent is informed that they are the selected delivery agent and should deliver the product(s) and/or service(s) to the customer.

Those skilled in the art will appreciate that an additional pre-selection step may be employed between steps 78 and 82 for selecting a subset of the combinations of delivery agents and business outlets for testing via step 82, without departing from the scope of the present invention. With access to the present teachings, one skilled in the art may implement unique method 70 in software without undue experimentation.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A system for facilitating transactions between customers and businesses comprising:

first means for initiating a transaction between a customer and a business entity, said transaction associated with a product or service;

second means for automatically selecting a mechanism for delivering said product or service to said customer from a plurality of mechanism for delivering in accordance with predetermined selection criteria and providing a signal in response thereto, said plurality of mechanism for delivering independent from said business entity, and wherein said predetermined selection criteria includes a maximum value of $w_c$, which is defined in accordance with the following equation:

$$W_c = aW_P + bW_R + cW_D,$$

where $W_P$ is a function of delivery prices associated with said mechanism for delivering, $W_R$ is a function of delivery reliability of said mechanism for delivering, $W_D$ is a function of the distance between said mechanism for delivering, said customer, and a business outlet associated with said business entity, and a, b, and c, are values that may be specified by a customer; and third means for automatically facilitating delivery of said product or service to said customer via said mechanism for delivering in response to said signal.

2. The system of claim 1 wherein said system further includes a bidding system for facilitating selecting an independent delivery agent associated with said mechanism for delivering that offers said maximum value of $W_c$.

3. A system for facilitating transactions between customers and businesses comprising:

first means for initiating a transaction between a customer and a business entity, said transaction associated with a product or service;

second means for automatically selecting a mechanism for delivering said product or service to said customer from a plurality of mechanism for delivering in accordance with predetermined selection criteria and providing a signal in response thereto, said plurality of mechanism for delivering independent from said business entity and wherein said second means further includes:

means for automatically selecting a delivery agent associated with said mechanism for delivering from a plurality of delivery agents based on a distance between said mechanism for delivering, said business entity, and said customer said plurality of delivery agents including independent delivery agents, and wherein said distance associated with said mechanism for delivering is the shortest total distance between said selected delivery agent, said business entity, and said customer wherein said total distance is the sum of the distance between said selected delivery agent and said business entity and the distance between said business entity and said customer, and wherein said delivery agents include messenger services, and wherein said second means includes means for automatically selecting a messenger from among said messenger services based on a distance between said messenger, said business entity, and said customer, said messenger services capable of accessing said system via the Internet, and third means for automatically facilitating delivery of said product or service to said customer via said means for delivering in response to said signal.

4. A system for facilitating constructive business communications between delivery agents, businesses, and a customer comprising:

a customer product order interface for receiving customer product orders as input and providing a first signal in response thereto, said customer product orders associated with a predetermined business;

a look-up system for selecting an independent delivery agent for delivery of a product associated with said customer product orders to said customer in response to said first signal and with reference to a distance between said delivery agent, said customer, and said business and providing a second signal in response thereto;

a delivery agent order delivery system for providing said selected delivery agent with a delivery order based on said customer product order in response to said second signal;

a merchant selection system for selecting a business outlet associated with said predetermined business based on a location of said business outlet relative to said customer and an availability status of said product at said location; and a product inventory checking system for determining business locations with said product, and wherein said look-up system includes means for selecting a delivery agent in accordance with $W_c$, which is defined in accordance with the following equation:

$$W_c = aW_P + bW_R + cW_D + dW_T,$$

where $W_P$ is a function of delivery prices associated with said delivery agent, $W_R$ is a function of delivery reliability of delivery agent, $W_D$ is a function of the distance between said delivery agent, said customer, and a business outlet associated with said business entity, $W_T$ is a function of an estimated delivery time required by said means for delivering, and a, b, c, and d are customer-adjustable coefficients.

5. The system of claim 4 wherein said system further includes a delivery agent bidding system for running a bid between candidate delivery agents, a winning delivery agent corresponding to said selected delivery agent and chosen in response to input provided by said customer, said winning delivery agent associated with the highest value of $W_c$ among candidate delivery agents.

6. A system for facilitating transactions between customers and businesses comprising:
   first means for initiating a transition between a customer and a business entity, said transaction associated with a product or service,
   second means for automatically selecting an independent delivery agent for delivering said product or service to said customer based on predetermined selection criteria including results of a weighting formula, said weighting formula including means for enabling said customer to specify priorities associated with each of said selection criteria and providing a signal in response thereto, said second means further including:
   means for enabling a user to selectively activate a bidding system to enable plural delivery agents to compete based on said criteria and in accordance with said specified priorities:
   means for selecting a set of business outlets associated with said business entity said business outlets having said ordered products and/or services available, said business outlets located in a predetermined region about said shipping destination;
   means for selecting a set of delivery agents having coverage areas that include one or more business outlets of said set of business outlets and having hours of operation that include said time at which said order was placed; and
   means for ranking combinations of independent delivery agents and business outlets in order of desirability in accordance with said predetermined selection criteria, which includes distances between said delivery agents, business outlets, and said customer, delivery price information, and/or delivery reliability information, said second means for selecting further including means for selecting a high ranking immediately available messenger and providing said customer with corresponding estimated delivery information, including fees, and/or delivery times in response thereto; and
   third means for automatically facilitating delivery of said product or service to said customer via said delivery agent in response to said signal.

7. The system of claim 6 wherein said second means further includes means for allowing said customer to accept or reject said selected delivery agent and providing said signal in response thereto, said means for providing including means for directing said delivery agent to deliver said ordered product and/or service to said customer in response to said signal.

8. The system of claim 7, wherein said system further includes:
   means for obtaining order information identifying associated products and/or services, time of an associated order, priority of said order, and the business entity with which said order was placed;
   means for selecting a set of business outlets associated with said business entity that have product(s) associated with said order in stock or service(s) associated with said order available and that are located in a predetermined region about a shipping destination;
   means for selecting a set of delivery agents whose coverage areas include one or more business outlets of said set of business outlets;
   means for determining weights for combinations of delivery agents and business outlets in accordance with estimated delivery times, distances between said business entity, said delivery agents, said shipping destination, and/or prices;
   means for sorting said combinations so that delivery agents are arranged in order of desirability in accordance with said weights;
   means for testing in order of decreasing desirability weights, the immediate availability of delivery agents associated with said combinations until an immediately available delivery agent is found; and
   means for providing said customer with contact information pertaining to a found delivery agent, estimated delivery fees, and estimated delivery time if a delivery agent is found, and providing order information to the found delivery agent specifying locations of said business entity, said customer, and an order number; otherwise informing said customer that delivery service is unavailable at the specified shipping destination.

9. A system for facilitating business communications between delivery agents, businesses, and a customer comprising:
   a customer product order interface for receiving customer product orders as input and providing a first signal in response thereto, said customer product orders associated with a predetermined business;
   a look-up system for selecting an independent delivery agent for delivery of a product associated with said customer product orders to said customer in response to said first signal and with reference to a distance between said delivery agent, said customer, and said business, and providing a second signal in response thereto, and wherein said look-up system includes means for selecting a delivery agent in accordance with $W_c$, which is defined in accordance with the following equation:

$$W_c = aW_P + bW_R + cW_D + dW_T,$$

where $W_P$ is a function of delivery prices associated with said delivery agent, $W_R$ is a function of delivery reliability of delivery agent, $W_D$ is a function of the distance between said delivery agent, said customer, and a business outlet associated with said business entity, $W_T$ is a function of an estimated delivery time required by said means for delivering, and a, b, c, and d are customer-adjustable coefficients;
   a delivery agent order delivery system for providing said selected delivery agent with a delivery order based on said customer product order in response to said second signal;
   a merchant selection system for selecting a business outlet associated with said predetermined business based on a location of said business outlet relative to said customer and an availability status of said product at said location; and
   a product inventory checking system for determining business locations with said product.

10. A system for facilitating transactions between customers and businesses comprising:
- first means for initiating a transaction between a customer and a business entity, said transaction associated with a product or service;
- second means for selecting an independent delivery agent for delivering said product or service to said customer based on predetermined selection criteria that includes results of a weighting formula, said weighting formula including means for enabling said customer to specify priorities associated with each of said selection criteria and providing a signal in response thereto, said second means further including:
  - means for selecting a set of business outlets associated with said business entity, said business outlets located in a predetermined region about said shipping destination;
  - means for selecting a set of delivery agents having coverage areas that include one or more business outlets of said set of business outlets and having hours of operation that include said time at which said order was placed; and
  - means for ranking combinations of independent delivery agents and business outlets in order of desirability in accordance with said predetermined selection criteria, which includes distances between said delivery agents, business outlets, and said customer, delivery price information, and/or delivery reliability information, said second means further including means for selecting a high ranking immediately available messenger and providing said customer with corresponding estimated delivery information, including fees, and/or delivery times in response thereto; and
- third means for facilitating delivery of said product or service to said customer via said delivery agent in response to said signal.

* * * * *